(12) United States Patent
Chen et al.

(10) Patent No.: US 10,127,689 B2
(45) Date of Patent: Nov. 13, 2018

(54) MOBILE USER INTERFACE DESIGN TESTING TOOL

(71) Applicant: INTERNATIONAL BUSINESS MACHINES CORPORATION, Armonk, NY (US)

(72) Inventors: Chun-Fu Chen, Elmsford, NY (US); Paolo Girolami, Rome (IT); Joseph W. Ligman, Wilton, CT (US); Marco Pistoia, Amawalk, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 8 days.

(21) Appl. No.: 15/385,699

(22) Filed: Dec. 20, 2016

(65) Prior Publication Data
US 2018/0174330 A1    Jun. 21, 2018

(51) Int. Cl.
*G06T 7/00* (2017.01)
*G06F 8/38* (2018.01)
*G06F 8/20* (2018.01)
*G06F 11/36* (2006.01)
*G06T 11/60* (2006.01)
(Continued)

(52) U.S. Cl.
CPC .............. *G06T 7/97* (2017.01); *G06F 8/20* (2013.01); *G06F 8/38* (2013.01); *G06F 11/3664* (2013.01); *G06T 7/337* (2017.01); *G06T 11/60* (2013.01); *G06T 7/60* (2013.01); *G06T 7/74* (2017.01); *G06T 7/90* (2017.01); *G06T 2200/24* (2013.01);
(Continued)

(58) Field of Classification Search
CPC .............. G06T 7/337; G06T 2200/24; G06T 2207/20221; G06T 2207/20228; G06F 8/20; G06F 8/38
See application file for complete search history.

(56) References Cited

U.S. PATENT DOCUMENTS

| | | |
|---|---|---|
| 7,002,589 B2 | 2/2006 | Deering |
| 7,538,750 B2 | 5/2009 | Kim et al. |

(Continued)

FOREIGN PATENT DOCUMENTS

CN         105163114 A       12/2015

OTHER PUBLICATIONS

Chang et al., "GUI Testing Using Computer Vision," ACM Conference on Human Factors in Computing Systems (CHI 2010), Atlanta, Georgia USA, Apr. 10-15, 2010.

(Continued)

*Primary Examiner* — Antonio A Caschera
(74) *Attorney, Agent, or Firm* — Intelletek Law Group, PLLC; Gabriel Daniel, Esq.

(57) ABSTRACT

A tool for verifying a user interface (UI) design of a mobile application receives a screenshot of the application's UI operating at a target device and retrieves a reference UI design image that corresponds to the received screenshot. The tool generates a plurality of images based on discrepancies between the screenshot and the reference UI design image. The plurality of images include a set of differential images in which each pixel location has a value that is based on a difference between corresponding pixels at the same pixel location of the reference UI design image and of the screenshot. The plurality of imagers also include at least one blended image that is an overlay of the reference UI design image with the screenshot.

6 Claims, 9 Drawing Sheets

(51) Int. Cl.
*G06T 7/33* (2017.01)
*G06T 7/60* (2017.01)
*G06T 7/90* (2017.01)
*G06T 7/73* (2017.01)

(52) U.S. Cl.
CPC .............. *G06T 2207/20221* (2013.01); *G06T 2207/20228* (2013.01); *G06T 2210/62* (2013.01)

(56) References Cited

U.S. PATENT DOCUMENTS

| | | |
|---|---|---|
| 8,249,363 B2 | 8/2012 | Lee et al. |
| 8,938,683 B2 * | 1/2015 | Bentrup .............. G06F 11/3664 715/760 |
| 8,947,410 B2 | 2/2015 | Butler et al. |
| 9,332,252 B2 | 5/2016 | Silva |
| 9,372,779 B2 | 6/2016 | Ligman et al. |
| 2010/0211893 A1 * | 8/2010 | Fanning ................... G06F 8/38 715/760 |
| 2011/0252405 A1 | 10/2011 | Meirman et al. |
| 2013/0120330 A1 | 5/2013 | Kang et al. |
| 2014/0218385 A1 | 8/2014 | Carmi |

OTHER PUBLICATIONS

Dann, Jonathan, "FBSnapshotTestCase" GitHub website (https://github.com/facebook/ios-snapshot-test-case) 2016.

* cited by examiner

MOBILE USER INTERFACE DESIGN TESTING TOOL

BACKGROUND

Technical Field

The present disclosure generally relates to methods and systems for verifying user interface design, and more particularly to methods and systems for verifying user interface design applications on mobile device platforms.

Description of the Related Art

As mobile computing devices such as smart phones become more powerful and ubiquitous, software developers hasten to provide more applications targeting mobile device platforms. An important component of software development for mobile devices is user interface (UI) design and verification.

SUMMARY

Some embodiments of the disclosure provide a tool for verifying a user interface (UI) design of an application. The tool receives a screenshot of the application's UI operating at a target device and retrieves a reference UI design image that corresponds to the received screenshot. The tool generates a plurality of images based on discrepancies between the screenshot and the reference UI design image. The plurality of images include a set of differential images in which each pixel location has a value that is based on a difference between corresponding pixels at the same pixel location of the reference UI design image and of the screenshot. The plurality of images also include at least one blended image that is an overlay of the reference UI design image with the screenshot. The tool then presents the generated plurality of images in one view.

In some embodiments, the tool identifies a UI element in the reference UI design image and a corresponding UI element in the captured screenshot. The tool presents quantitative information regarding position and size of the identified UI element. The quantitative information of the identified UI element from the screenshot is presented together with the corresponding identified UI element from the reference UI design image.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a UI design verification tool for mobile applications. The tool assists in the verification of the UI design of a mobile application by identifying discrepancies between a reference UI design image of the application and a screenshot captured from a mobile device running the application. The tool presents the identified discrepancies in several different perspectives and provides qualitative and quantitative analysis of the identified discrepancies. The presentation of the identified discrepancies can be used to revise the mobile application and/or its UI design. The tool increases development speed for mobile applications by providing improved representations and descriptions of design defects.

Figure 8:
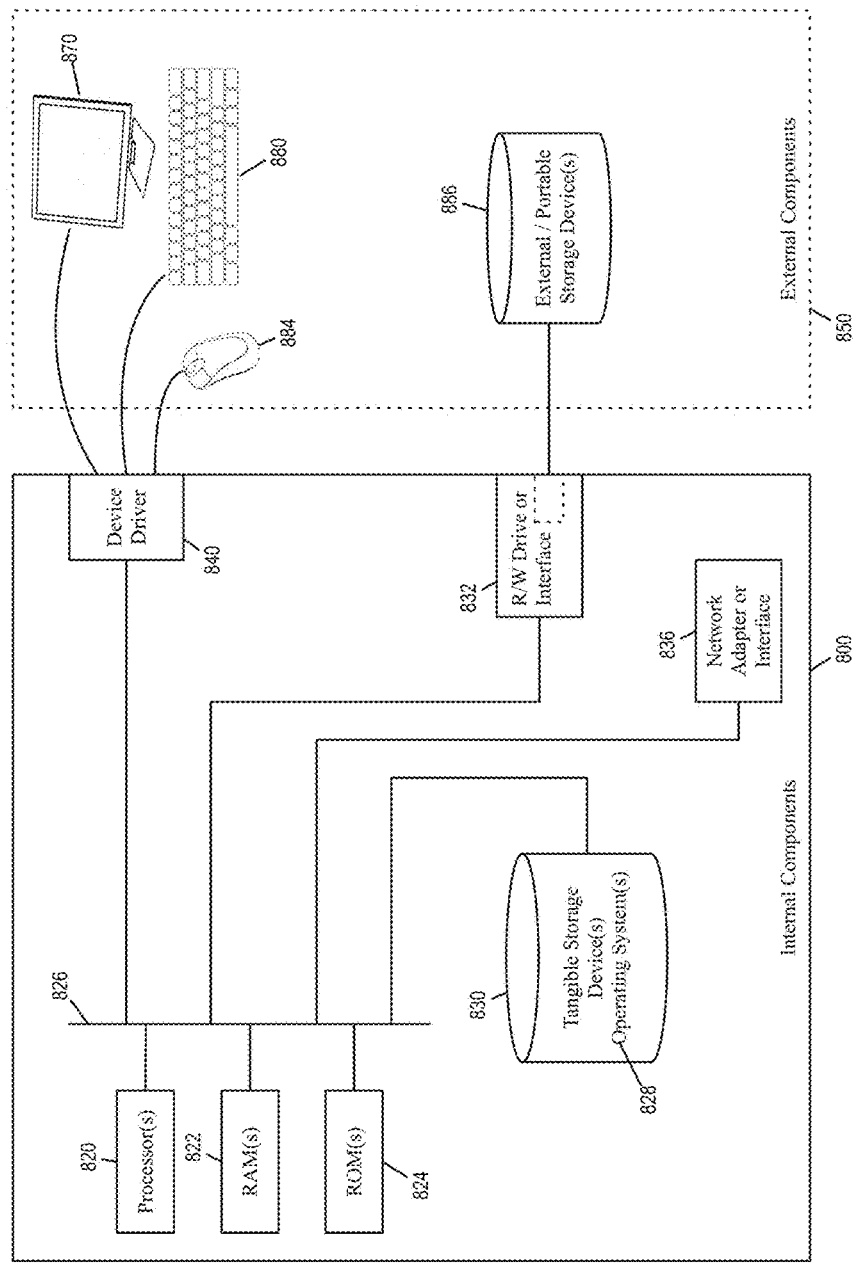
FIG. 8 shows an example block diagram of the components of a data processing system in accordance with an illustrative embodiment of the present disclosure.

The UI design verification tool is a computer program operating in a computing device, such as a laptop, a desktop, a workstation, or any other types of data processing system. FIG. 8 below describes a computing device or data process system capable of implementing the UI design verification tool. The UI design verification tool includes a validation system and an auto-fixing system. The validation system of the UI design verification tool performs image retrieval, coarse-grain verification, and fine-grain level verifications. The image retrieval provides a reference UI design image of the application and a screenshot captured from a mobile device running the application. The coarse-grain level (or image level) verification provides a qualitative presentation of the discrepancies between the reference UI image and the captured screenshot. The fine-grain level (or sub-image level) verification provides quantitative measurements of the discrepancies. The auto-fixing system of the UI design verification tool uses the measurements of the discrepancies as revision insights to fix defects in the application and/or the UI design that causes the discrepancies. In some embodiments, the UI design verification tool is a utility embedded in an integrated development environment (IDE) that includes a simulator of a mobile device operation system (such as an iOS® simulator).

Figure 1A:
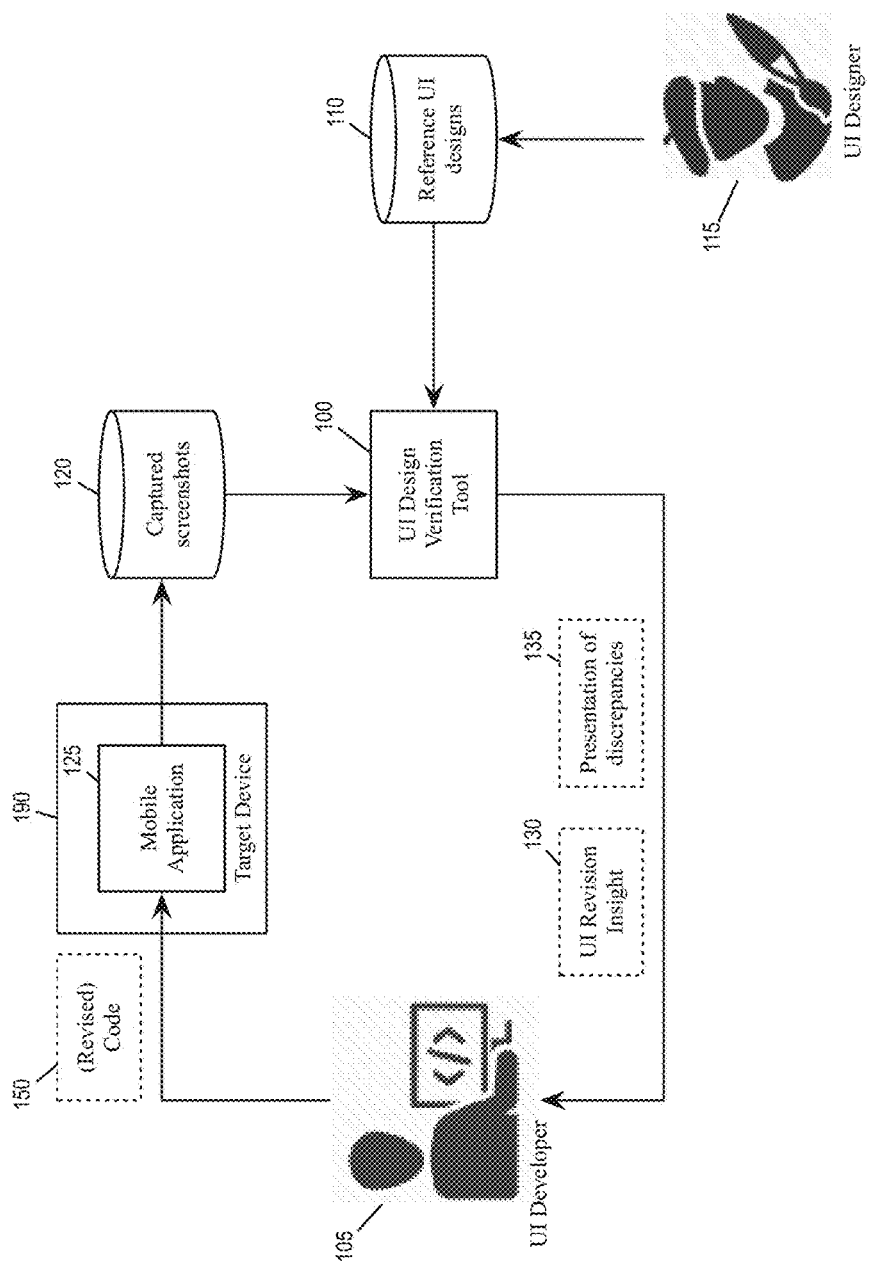
FIG. 1a illustrates an example mobile application user interface (UI) design verification flow.

FIG. 1a illustrates a mobile application UI design-verification flow according to some embodiments of the disclosure. The UI design verification flow is for a UI developer 105 using a UI design verification tool 100 to detect defects in the coding of a mobile application 125. Specifically, the UI design verification tool 100 is for identifying coding defects that result in discrepancies between the intended appearance of the UI and the actual appearance of the UI in a target device 190 running the mobile application 125.

A UI designer 115 of the mobile application 125 specifies the intended appearance of the UI as a set of reference UI design images 110, while screenshots 120 captured at the target device 190 provides the actual appearance of the UI. The set of reference UI design images 110 is therefore also referred to as the "ground truth" of the UI design. The UI design verification tool 100 identifies defects in the mobile application 125 by identifying discrepancies between the reference UI images 110 and the screenshots 120. The UI design verification tool 100 creates a presentation 135 of the identified discrepancies and generates a set of UI revision insights 130 based on an analysis of the discrepancies. The UI developer 105 can use the presentation 135 to identify the defect in the coding of the mobile application. The UI developer can also use the generated revision insights 130 to revise coding 150 of the mobile application 125.

The mobile application 125 is an application that is programmed to operate in a mobile device (hence referred to as a mobile application) based on source code 150. In some embodiments, the mobile application 125 is configured to operate in different types of mobile device platforms, i.e., mobile devices having different display dimensions, different display granularities, different operating systems, different graphical processing units (GPUs), different central processing units (CPUs), or other differences in software/hardware. The source code 150 includes code segments that are applicable to multiple different types of mobile devices. The source code 150 may also include code segments that are specifically targeting a particular type of mobile devices. Some of these code segments relate to the UI such that any error or imperfection may cause the application to produce incorrect UI image outputs at certain types of mobile devices.

The target device 190 is a computing device that operates the mobile application 125. Its graphical output when operating the mobile application 190 is captured as screenshots 120 to be compared with the reference UI design images 110. The target device 190 can be an actual physical device that is the target platform of the mobile application under development. The target device 190 can also be a virtual device provided by a simulation platform such as the iOS® simulator, which is itself a program running on a computing device that may or may not be the target device platform. Thus, the target device is either a mobile device or a simulation platform that is emulating a mobile device, a mobile device such as a smart phone, tablet computer, smart wearables, smart watch, laptop computer, or other portable computing devices that can be used while being moved from place to place.

More generally, the target device 190 can also be any computing device (such as a desktop computer or workstation) capable of supporting a graphical UI, and the UI design verification tool 100 is for identifying discrepancies between reference UI design images of an application and screenshots captured from such a computing device or an emulator of such a computing device running the application. In these instances, the application 125 is not necessarily a mobile application but can be any GUI-supporting application running on the target device 190.

The screenshots 120 may be collected from an actual physical device running the mobile application and kept in a storage that is accessible by the UI design verification tool 100. In some embodiments in which the UI design verification tool 100 is a utility embedded in an IDE, the IDE includes a simulator of the target device. The simulator running the mobile application produces the screenshots 120 for analysis by the UI design verification tool 100.

Figure 1B:
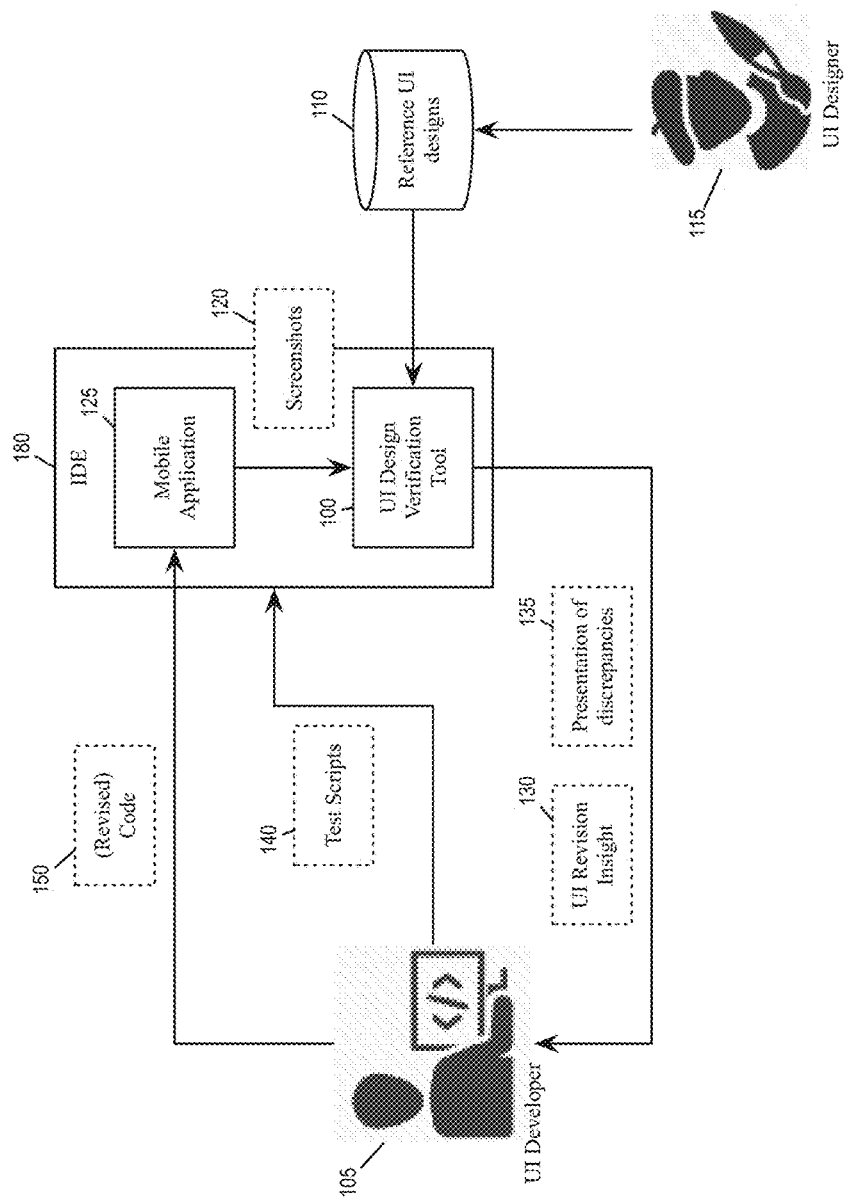
FIG. 1b illustrates an example mobile application UI design-verification flow in which an integrated development environment (IDE) of a mobile device platform produces the screenshots for verification by the UI design verification tool.

FIG. 1b illustrates a mobile application UI design-verification flow in which an IDE 180 of a mobile device platform produces the screenshots 120 for verification by the UI design verification tool 100. As illustrated, the UI design verification tool 100 is a utility of the IDE 180. The IDE 180 also operates a mobile device simulator that runs the mobile application 125. The IDE running the mobile application 125 in turn produces the screenshots 120 for the UI design verification tool 100 to compare with the reference UI design images 110.

The operations of the IDE can be driven by a set of test scripts 140 that are executable scripts recognized by the IDE 180. They drive the operations of the IDE and the mobile application (by e.g., providing inputs) such that the mobile application being simulated 125 would produce the desired screenshots 120 for comparison with the UI design verification tool 100. In some embodiments, the UI test scripts 140 also drive the operations of the UI design verification tool 100. The test scripts 140 specify how to analyze the discrepancies between the reference UI design images and the captured screenshots, such as qualitatively specifying the types of discrepancies to report to the user, or quantitatively setting a threshold such that only discrepancies exceeding the threshold would be reported.

The presentation 135 provides various visual cues to aid the UI developer 105 in identifying coding defects of the mobile application 125. Specifically, the UI design verification tool 100 compares the reference UI design image 110 with the captured screenshots 120 and displays the discrepancies in multiple different views, aspects, and/or dimensions. The presentation 135 includes both quantitative information and qualitative analysis regarding the discrepancies. The UI design verification tool 100 presents the quantitative information and the qualitative analysis at the level of the overall image (image level) and at the level of individual elements of the image (sub-image level). The generated presentation 135 is displayed to the user through a display device (e.g., as part of a GUI provided by the UI design verification tool) or delivered to the user as a file through a storage device.

Figure 2:
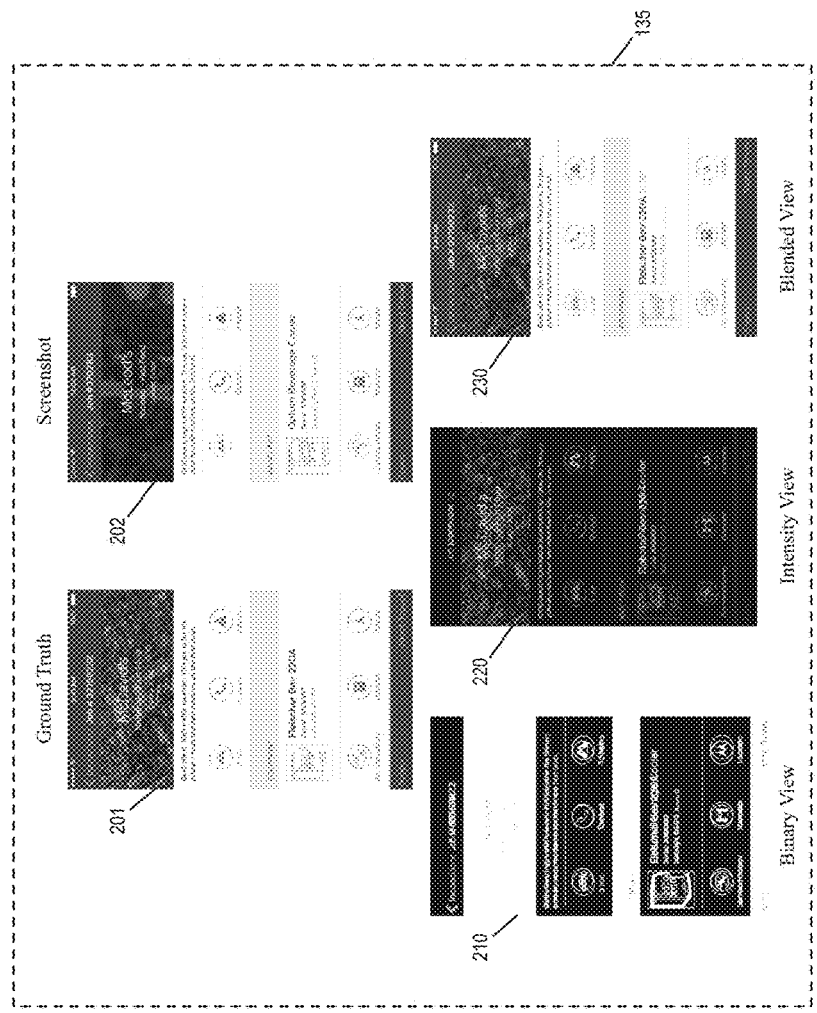
FIG. 2 illustrates an example of the presentation of the discrepancies generated by the UI design verification tool.

FIG. 2 illustrates an example of the presentation of the discrepancies generated by the UI design verification tool 100. Specifically, the figure illustrates the presentation 135 showing the discrepancies between a reference UI design image 201 and a screenshot 202 by generating three different images 210, 220, and 230 that are based on three different analysis of the discrepancies. The UI design verification tool 100 may present the screenshot 202, the corresponding reference UI design image 201, and the generated images 210, 220, and 230 of the discrepancies in one view (such as illustrated in the figure) to enable the developer to compare and contrast the different analysis. The UI design verification tool may also present the screenshot 202, the corresponding reference UI design image 201, and the different analysis of the discrepancies in different views so the developer may view each analysis in greater detail.

Figure 3:
FIG. 3 is an enlarged version of a binary image, consistent with an exemplary embodiment.

The generated image 210 is a binary image based on a binary analysis of the discrepancies. In the binary image 210, each white pixel (or a first color) indicates a pixel location at which the reference UI design image 201 differs with the screenshot 202 by greater than a threshold, while each black pixel (or a second color) indicates a pixel location at which the reference UI design image 201 differs with the screenshot 202 by less than or equal to the threshold. In some embodiments, the UI design verification tool uses differences in luminance and chrominance values (e.g., YUV or RGB) to determine whether the reference UI design image 201 differ with the screenshot 202 at each pixel location. Generally, the binary image uses binary colors to show pixel locations at which the reference UI design image 201 and the screenshot 202 match, as well as pixel locations at which they differ. FIG. 3 is an enlarged version of the binary image 210. It is worth noting that the region 310 in the binary image 210 is nearly completely white to indicate that the reference UI design image 201 differs from the screenshot 202 beyond a certain threshold within the region 310, even though that difference may not be noticeable to the naked eye.

Figure 4:
FIG. 4 is an enlarged version of an intensity image, consistent with an exemplary embodiment.

The generated image 220 is an intensity variation image based on an intensity analysis of the discrepancies. In the intensity variation image 220, each pixel represents an intensity difference between the reference UI design image 201 and the screenshot 202 at that pixel location. The intensity variation of a pixel location is proportional to the difference in pixel values. The difference can be based on differences in luminance values, chrominance values, and/or in RGB values. In contrast to the binary image 210, the intensity variation image 220 shows the discrepancies in a graduated manner, where lighter pixels denote greater differences in pixel values (larger intensity variation), while darker pixels denote smaller differences in pixels values (smaller intensity variation). FIG. 4 is an enlarged version of the intensity variation image 220. As illustrated, the intensity variation image reveals misalignment between the reference UI design image 201 and the screenshot 202.

Figure 5:
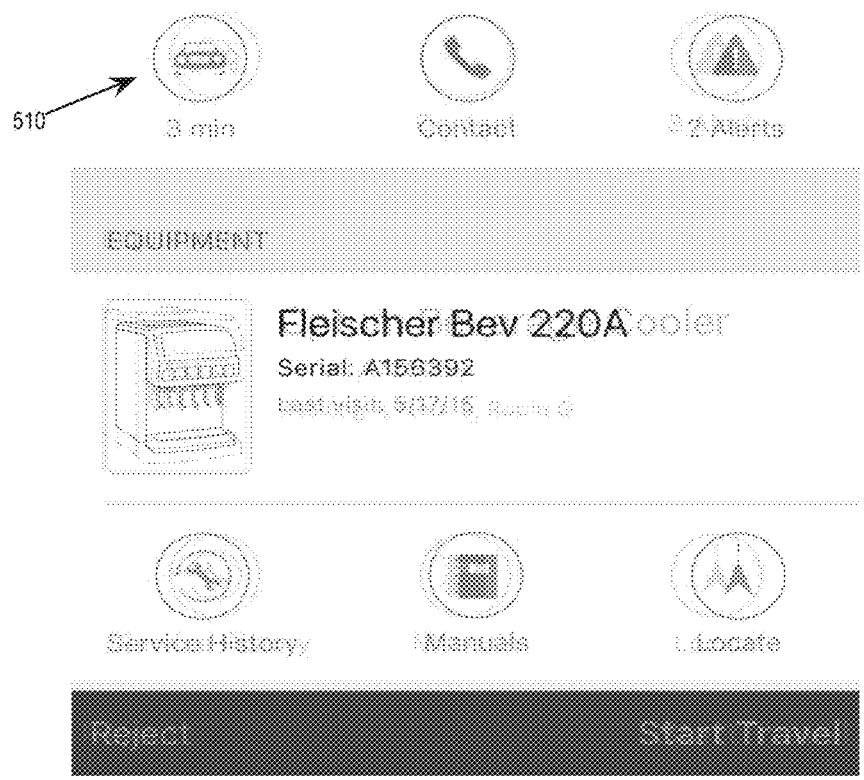
FIG. 5 is an enlarged version of a blended image, consistent with an exemplary embodiment.

The generated image 230 is a blended image of the reference UI design image 201 and the screenshot 202. Unlike the generated images 210 and 220 that are differential images based on pixel value differences at each pixel location between the reference UI design image 201 and the screenshot 202, the blended image 230 is an image that overlays the reference UI design image 201 with the screenshot 202 into one image. In some embodiments, the blended image is an overlay of transparencies in which the overlay from the reference UI design image 201 is made more prominent (i.e., less transparent) than the overlay from the screenshot 202. FIG. 5 is an enlarged version of the blended image 230. In the illustrated example, the reference UI design image is at 70% opacity while the screenshot is at 30% opacity. This allows the developer to distinguish the sharper and more obvious pixels of the reference UI design image 201 from the dimmer and less obvious pixels of the screenshot 202. With the blended image 230, the developer is not only able to see the misalignment between the reference UI design image 201 and the screenshot 202, he is also able to see the direction of the misalignment. For example, the developer can see the vehicle icon 510 being misaligned, with sharper pixels from the reference UI design image 201 positioned to left of the dimmer pixels from the screenshot 202. The developer would therefore know to modify the code of the application in order to move the vehicle icon 510 to the left.

The binary image 210, the intensity variation image 220, and the blended image 230 are all based on analysis at the image level, i.e., they are based on analysis performed by considering the reference UI design image and the screenshot as a whole without regard to individual UI elements. They are coarse-grain level presentations of the discrepancies between the reference UI design image and the captured screenshot that provides a qualitative presentation of the discrepancies. In some embodiments, the UI design verification tool 100 also provides a fine-grain level presentation of the discrepancies. The fine-grain level presentation provides quantitative measurements of the discrepancies. The fine-grain level presentation is also conducted at a sub-image level, i.e., they are analysis performed by considering individual UI elements in the image.

To perform sub-image level analysis of the discrepancies, the UI design verification tool 100 identifies corresponding UI elements in the reference UI design image 201 and in the screenshot 202. The UI design verification tool 100 also provides delineation of the identified elements. The UI design verification tool also performs discrepancy analysis for each of the identified UI elements. In some embodiments, the delineation of each identified UI element includes an indication of whether the identified UI element passes or fails a set of predefined constraints. Such constraints include location, size, and color for the identified element.

In some embodiments, to identify corresponding UI elements in the reference UI design image 201 and in the screenshot 202, the UI design verification tool applies edge detection techniques to identify regions of interest with high contrasts such as texts and icons. The UI design verification tool also uses dilation and erosion techniques to connect sparse salient points in forming connected components. The UI design verification tool delineates each set of connected components (by e.g., bounding boxes) as an identified UI element. Each delineated identified UI element encloses content of a particular type, such as text field or icon. To correlate delineated, identified UI elements from the reference UI design image 201 with those from the screenshot 202, the UI design verification tool uses a non-maximum suppression (NMS) method to identify pairs of the most correlated identified UI elements from the two images. NMS measures the ratio of intersected area over the union area of two identified UI elements. A sufficiently high NMS ratio value serves as an indication that the two UI elements are corresponding sub-image elements.

Figure 6:
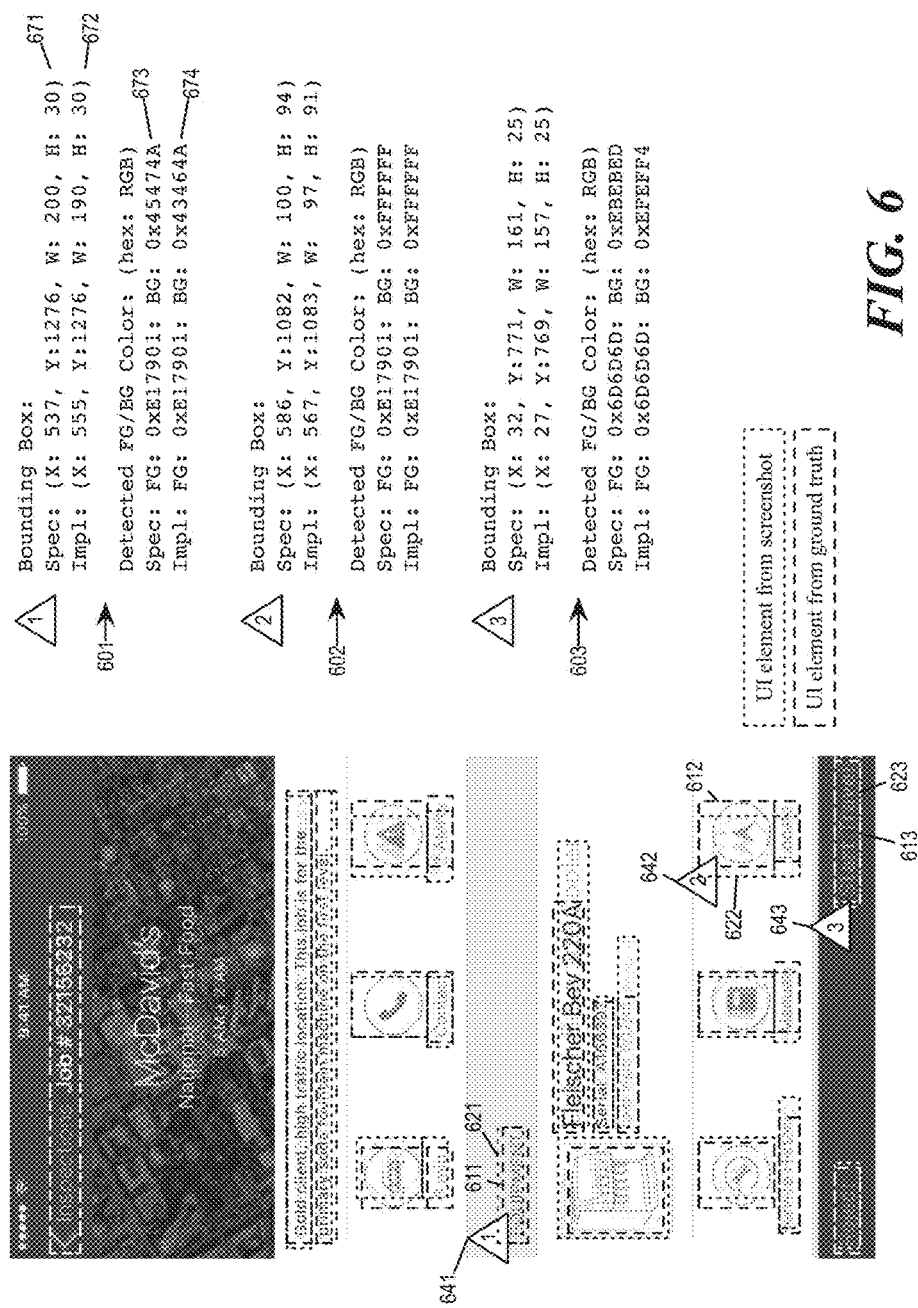
FIG. 6 illustrates an example sub-image level analysis of the discrepancies between a reference UI design image and a screenshot.

FIG. 6 illustrates an example sub-image level analysis of the discrepancies between the reference UI design image 201 and the screenshot 202. The sub-image level analysis may be presented in the same view as the image-level analysis (i.e., the images 210, 220, and 230). The sub-image level analysis may also be presented in a different view from the image-level analysis.

As illustrated, the sub-image level analysis is an image in which the different elements of the UI are identified and delineated. Specifically, the delineations are overlaid over a blended image of the reference UI design image 201 and the screenshot 202 (i.e., the blended image 230). Each identified UI element from the reference UI design image 201 is delineated, as well as each identified UI element from the screenshot 202.

In the example illustrated in FIG. 6, the delineation of each UI element is a box that surrounds the UI element. Among the delineated elements, the elements 611, 612, and 613 have corresponding failure indicators 641, 642, and 643, respectively. An UI element having a failure indicator is an UI element that failed to meet its constraints. A set of constraints for an UI element from the reference UI design image may include specification on the maximum allow difference (i.e., threshold) between its size and/or position and that of its corresponding UI element from the screenshot. In some embodiments, instead of using a failure indicator to mark an UI element as failing to meet its constraints, the UI design verification tool 100 makes the delineation of the UI element appear different (e.g., different color, different shape, different thickness) than delineations of UI elements that pass their constraints.

The UI design verification tool also presents sets of quantitative information regarding the identified UI elements. Each set of quantitative information is specific to a pair of corresponding identified UI elements from the reference UI design image 201 and from the screenshot 202. In the illustrated example as well as in some embodiments, the UI design verification tool displays element-specific information only for corresponding UI-element pairs that have failed their constraints (e.g., corresponding UI elements have positions, sizes, and/or colors that differ by quantities greater than certain thresholds). In some embodiments, the UI design verification tool displays element-specific information for all corresponding UI-element pairs.

The figure displays three sets of element-specific information 601, 602, and 603. The three sets of element-specific information 601, 602, and 603 are respectively associated with the delineated elements 611, 612, and 613 from the reference UI design image 201 and their corresponding delineated elements 621, 622, and 623 from the screenshot 202. As illustrated, each set of element-specific information for an identified pair of corresponding UI elements includes the position (X and Y) and size (W and H) of the element in the reference UI design image (e.g., the description of the UI element 611 at row 671), the position and size of the element in the captured screenshot (e.g., the description of the UI element 621 row 672), the detected foreground and background (FG and BG) colors of the UI element in the reference UI design image (e.g., the description of the UI element 611 at row 673), and the detected foreground and background colors of the UI element in the captured screenshot (e.g., the description of the UI element 621 at row 674.) In the figure, the label "spec:" indicate that the color or position information is "specified" by the reference UI design image, while the label "impl:" indicates that the color or position information is "implemented" in an actual application output.

The element-specific information 601-603 are also sets of quantitative information or numerical measurements that can be used to fix the source code of the mobile application. In some embodiments, the quantitative information is used as input to an automatic source code fixing procedure. According to the element-specific information 601 for the identified UI element 611, its X position should be moved left by 18 pixels and its width W should be made smaller by 10 pixels. According to the element-specific information 602 for the identified UI element 612, its X position should be moved right by 19 pixels and its size should be made smaller by 3 pixels in width W and in height H. According to the element specific information 603 for the identified UI element 613, its background color should be revised to 0xEBEBED.

Figure 7:
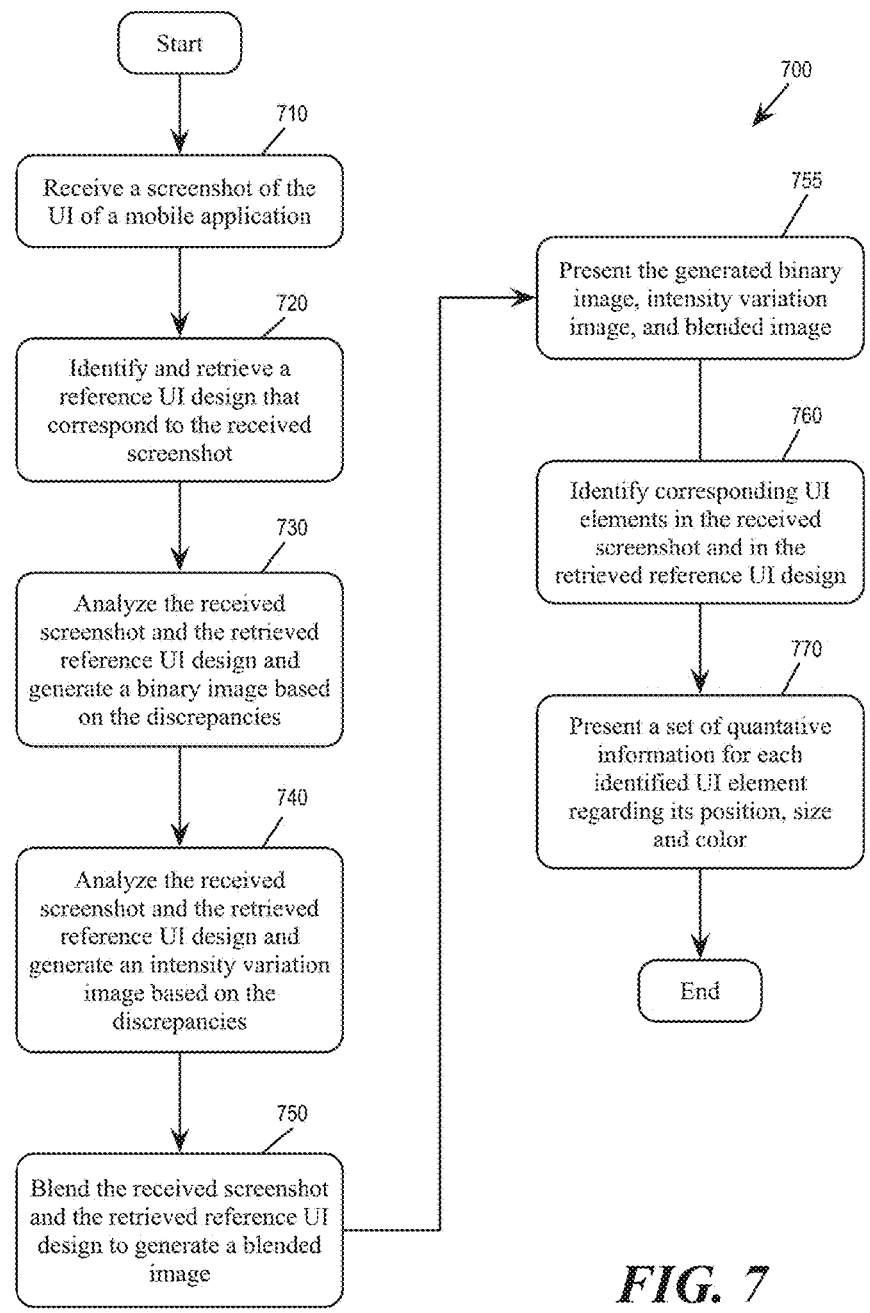
FIG. 7 conceptually illustrates an example process for verifying a mobile application by analyzing and presenting the discrepancies between a UI screenshot and a reference UI design image.

FIG. 7 conceptually illustrates a process 700 for verifying a mobile application by analyzing and presenting the discrepancies between a UI screenshot and a reference UI design image. In some embodiments, the UI design verification tool 100 uses the process 700 to aid a UI developer to identify flaws in the coding of the mobile application. In some embodiments, one or more processing units of a computing device hosting an IDE execute instructions that configure the computing device to perform the process 700.

The process 700 starts when it receives (at 710) a screenshot of the UI of a mobile application that is under test. Such a screenshot can be a screenshot collected from an actual physical device executing the mobile application. The screenshot can also be one that is generated by the IDE based on a test script that drives the IDE to execute the mobile application. The process 700 identifies and retrieves a reference UI design image that corresponds to the received screenshot (at 720). In some embodiments, the process compares or correlates the received screenshot with a collection of reference UI design images and selects a reference UI design image that has the best correlation score as the corresponding reference UI design image for the received screenshot.

The process analyzes (at 730) the received screenshot and the retrieved reference UI design image and generates a binary image based on the discrepancies. The generation of the binary image is described by reference to FIG. 3 above. The process analyzes (at 740) the received screenshot and the retrieved reference UI design image and generates an intensity variation image based on the discrepancies. The generation of the intensity variation image is described by reference to FIG. 4 above. The process also blends (at 750) the received screenshot and the retrieved reference UI design image to generate a blended image in which the reference UI design image is made to look more prominent than the screenshot, e.g., by making the reference UI design image less transparent than the screenshot. The generation of the blended image is described by reference to FIG. 5 above. At 755, the process presents the generated binary image, intensity variation image, and blended image to the user (through a display device.) In some embodiments, the generated images are presented in one view as illustrated in FIG. 2 above.

The process identifies (at 760) corresponding UI elements in the received screenshot and in the retrieved reference UI design image. The process then presents (at 770) a set of quantitative information and/or numerical measurements for each identified UI element regarding its position, size, and color. The quantitative information of each identified UI element from the screenshot is presented together with its corresponding identified UI element from the reference UI design image. The process may provide an indication that the quantitative information of an identified UI element from the reference UI design image and the quantitative information of an identified UI element from the screenshot are a corresponding pair. The quantitative information maybe used to automate code revision. The identification of corresponding UI elements and the presentation of quantitative information regarding identified UI elements are described by reference to FIG. 6 above. The process 700 then ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 8 shows a block diagram of the components of data processing systems 800 and 850 that may be used to implement a mobile application UI design verification tool (100) or an IDE for mobile applications (180) in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multi processor systems, microprocessor-based systems, network PCs, minicomputer systems, and distributed cloud computing environments that include any of the above systems or devices.

The data processing systems 800 and 850 may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the process 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the process 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a display device;
a set of one or more processing units; and
a storage device storing a set of instructions, wherein an execution of the set of instructions by the set of processing units configures the computing device to perform acts comprising:
receiving a screenshot of the application's UI operating at a target device;
retrieving a reference UI design image that corresponds to the received screenshot;
generating a plurality of images based on discrepancies between the screenshot and the reference UI design image, wherein the plurality of images comprise:
a set of differential images in which each pixel location has a value that is based on a difference between corresponding pixels at a same pixel location of the reference UI design image and of the screenshot, wherein the set of differential images comprises a binary image, wherein each pixel location of the binary image either has a first color pixel to indicate that a difference between the reference UI design image and the screenshot at the pixel location is below or equal to a threshold or a second color pixel to indicate that the difference between the reference UI design image and the screenshot at the pixel location is above the threshold; and
at least one blended image that is an overlay of the reference UI design image with the screenshot; and
presenting the generated plurality of images in one view at the display device.

2. The computing device of claim 1, wherein the plurality of images further comprises an image having an identified UI element and a delineation for the identified UI element.

3. The computing device of claim 2, wherein the computing device is further configured to present quantitative information regarding a position, a size and a color of the identified UI element.

4. The computing device of claim 1, wherein the set of differential images comprises an intensity variation image, wherein each pixel location of the intensity variation image shows the difference between the reference UI design image and the screenshot at the pixel location.

5. The computing device of claim 1, wherein the blended image is a transparent overlay of the reference UI design image and the screenshot, wherein the reference UI design image is made more prominent than the screenshot in the transparent overlay.

6. The computing device of claim 1, wherein the computing device is further configured to present the reference UI design image and the screenshot in a same view as the generated plurality of images.

\* \* \* \* \*